May 22, 1945.  H. CHIREIX  2,376,659
APPARATUS FOR DETECTING UNDERGROUND METALLIC OBJECTS
Filed Nov. 18, 1941
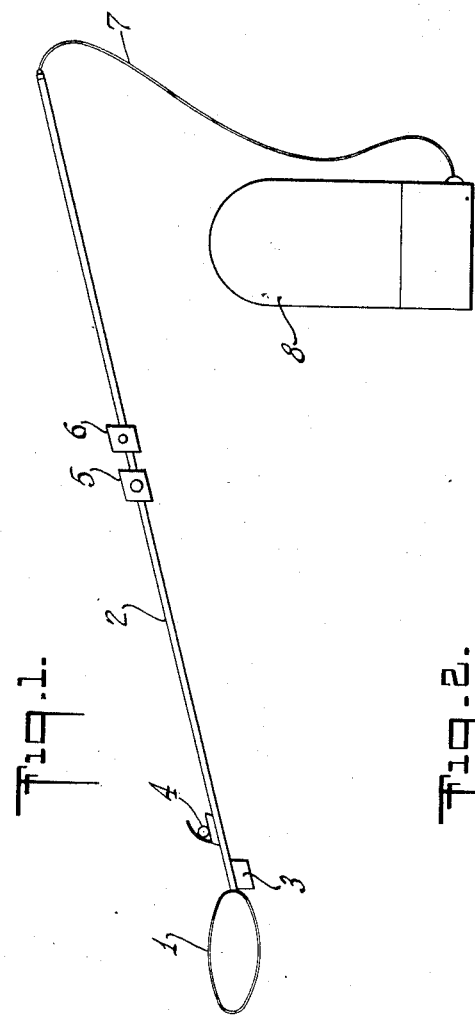
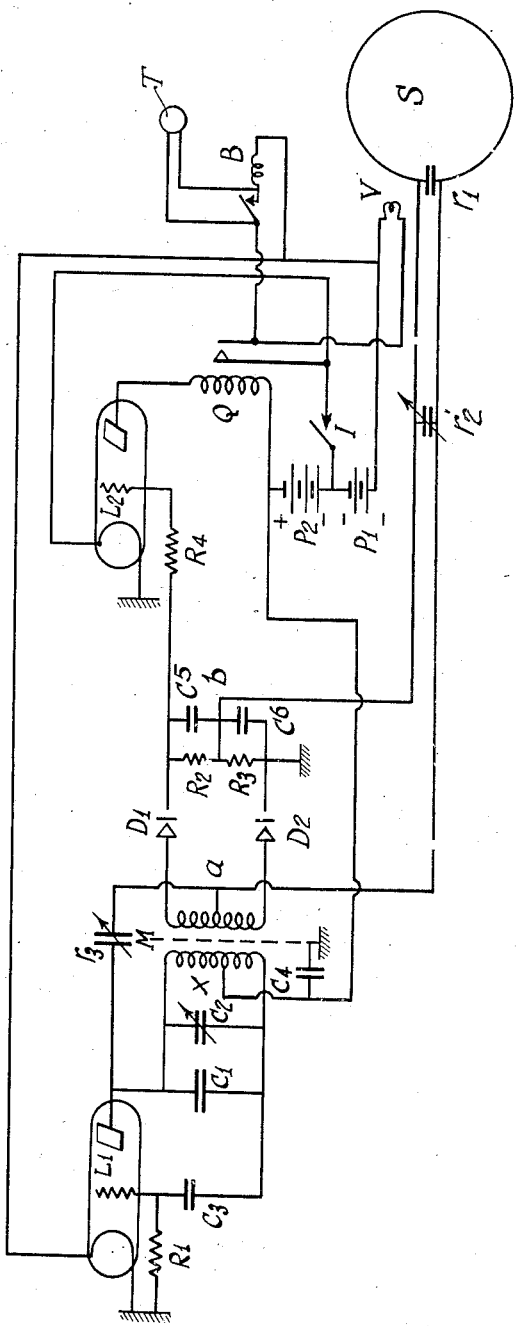
INVENTOR:
HENRI CHIREIX.
BY Haseltine, Lake & Co.
ATTORNEYS.

Patented May 22, 1945

2,376,659

UNITED STATES PATENT OFFICE 2,376,659

APPARATUS FOR DETECTING UNDERGROUND METALLIC OBJECTS

Henri Chireix, Paris, France; vested in the Alien Property Custodian

Application November 18, 1941, Serial No. 419,545
In France March 8, 1940

3 Claims. (Cl. 175—183)

The object of the present invention is to provide a plain rugged and portable apparatus enabling anyone to detect underground lying metallic objects such as shells or mines.

The principle of construction of the apparatus which will be hereinafter described, according to the invention, is the following:

If in a closed circuit comprising a loop and a condenser there flows an alternating current of a sufficiently high and stable frequency, the magnetic field of the said loop induces in the said underground object eddy currents which produce a counterfield, thus slightly modifying the characteristics of the circuit, which modification is indicated by the apparatus.

The apparatus to be designed being of the portable kind, with a loop of the order of 50 centimeters diameter, the existence, at distances of the order of one meter, of metallic objects, even of moderately important size will only modify the apparent self-induction of the loop in a measure of the order of $10^{-5}$ (one or several one hundred thousandths). By reason of such circumstances, the invention provides for the following conditions:

1. The frequency of the currents flowing in the closed circuit must be very stable;
2. The said closed circuit must be most approximately tuned at resonance;
3. The indicating apparatus must be extremely sensitive to tuning variations.

The means for the embodiment of the invention comprise principally, in combination:

1. A frequency generator consisting in a very slightly loaded valve generator, coupled with the circuit in which the aforementioned loop is included;
2. An electric circuit, comprising the loop, of a very high quality, which means of a most high selectivity;
3. An indicating apparatus, of the phasemeter type, indicating the phase variations of the current in the circuit with reference to the phase of the generator voltage. Such phasemeter acts on the indicating apparatus itself (for instance, a lamp signal).

The frequency to be used shall be comprised in a determined frequency band, in order to take into account, first, that electrostatic effects must be made negligible and, second, that currents induced in the ground itself must also have but a negligible effect.

For instance, in order to reduce electrostatic effects, the search loop must have only one winding of low resistance and the wavelength shall be preferably chosen at least equal to a hundred times the developed length of the said loop, that is, to at least 157 meters for a loop with a 50 centimeter diameter. In fact, in an apparatus actually designed and constructed, the wavelength is 300 meters, which means a frequency $f=10^6$ cycles. These considerations thus give an upper frequency limit. The lower frequency limit is determined by the other consideration, that is, the possibility of realizing a high quality circuit and the influence of the ground. Practically, the band of usable frequencies coarsely lies between 2 times $10^5$ and 2 times $10^6$.

The invention is illustrated in and by the following drawing, in which:

Figure 1 diagrammatically shows the apparatus according to the invention and

Figure 2 is schematic diagram of the circuit used.

Referring to Figure 1 of the drawing, the circular loop 1 is made of a light metal tube carried at the end of an insulating rod 2. The main tuning condenser is a mica insulated condenser, with a capacity of the order of 20,000 micro-microfarads, located at point 3, where the said tube is fixed on the insulating rod.

The tube itself is preferably enameled, in order to avoid a partial short circuit, if it comes in contact with the wet ground.

The fitting of the loop on the rod must also be carefully made, in order to avoid any defective insulation.

The signalling lamp 4 is also located away near the far end of the rod, so as to allow for simultaneously looking at the position of the loop near the ground and at the signal of the lamp.

The carrying end of the rod is held under the operator's arm and, at the height of its hand, it is provided with an adjustable vernier condenser 5, in shunt with the main condenser. Such vernier condenser with a capacity of but a few micro-microfarads locates the working point of the phasemeter in the used portion of its characteristic curve. Next to the vernier condenser is also located a main switch 6. Finally, the end of the rod farthest from the loop is connected, by means of a cable 7, with the main apparatus, lodged in a casing 8, carried on the operator's back.

Referring now to Figure 2 of the drawing, there will be described the electrical circuit of the apparatus. $L_1$ and $L_2$ are the two valves of the said circuit. They may be, for instance, two triodes, or two pentodes, preferably connected and used as triodes, with low heating current cathodes, both cathodes being series connected with a 4.5 volt battery $P_1$. Valve $L_1$ is used for the generation of the oscillations and $L_2$, for the actuation of the indicator. For such purpose, $L_1$ is connected with a tunable circuit comprising the primary of a voltage lowering transformer M, with iron powder core, a main fixed capacitor $C_1$ and an adjustable vernier capacitor $C_2$. Coupling capacitor $C_3$ and grid leak $R_1$ complete the generator unit the anode voltage of which is supplied by means of a 90 volt battery $P_2$; a suitable decoupling condenser $C_4$ being connected in the circuit at X, for example, with the primary coil of core M.

The search circuit comprising loop S is tuned by means of the fixed main capacitor $r_1$, located in the immediate vicinity of the said loop, and of adjustable capacitor $r_2$, carried on the rod, as has been hereinbefore stated. The terminals of the conductor fixed to the carrying rod are connected to the terminals $a$ and $b$, on the main apparatus casing.

The circuit of the said main apparatus is excited by means of an adjustable coupling condenser $r_3$, the capacity of which amounts to but a few micro-microfarads. There is, in fact, visible that starting at the anode of valve $L_1$, a circuit comprising, in series, $r_3$, $r_2$, $C_6$ ($C_6$ being a capacitor with a large capacity value for instance .005 microfarad) closes itself at the ground, that is at the cathode of valve $L_1$. By virtue of the well known properties of coupled circuits, the voltage at terminals $a$, $b$ is, the search circuit being at resonance, in phase quadrature leading on the voltage at the secondary terminals of M. The voltage amplitude across $a$ and $b$ is, moreover, a rather low part of the voltage across the plates of $C_1$, and is adjustable by acting on $r_3$.

On the other part, the secondary terminals of the screened transformer M are connected in order to feed two dry rectifiers $D_1 D_2$, the circuit of which is closed on two high and equal resistors $R_2$ and $R_3$, the resistance of which may be 200,000 ohms, which are shunted by means of two equal capacitors $C_5 C_6$.

This part of the circuit appears to form a Wheatstone bridge, one diagonal of which is fed by the search circuit, and the other by the secondary of M. The voltage amplitude across terminals $ab$ having been adjusted by means of capacitor $r_3$, at such value that it substantially equals the voltage developed on one half of the secondary of M, it appears that, at resonance of the search circuit, each one of both detectors $D_1$ and $D_2$ is under the same resulting voltage, practically equal to $$\frac{1}{\sqrt{2}}$$

times the voltage across $ab$ (two voltages equal and in phase quadrature one with the other).

Under such conditions the rectified voltage across ground and $R_4$ is zero. On the contrary, as soon as any metallic body present happens to reduce the apparent self-induction of loop S, the voltage across $ab$ begins to lead by a definite amount, so that, the two voltages being no more in exact quadrature the voltage rectified by D, and smoothed across the terminals of $C_5$ becomes less than that rectified by $D_2$ and smoothed across the terminals of $C_6$. Thus there appears a negative voltage across ground and $R_4$.

Reciprocally, an electrostatic effect on the loop would cause the appearance of a positive voltage across ground and $R_4$.

Such voltage is used to bias valve $L_2$, the resistor $R_4$, of high resistance (1 megohm for instance) preventing electrostatic effects to bring the grid to any potential appreciably positive with reference to the cathode.

A signaling relay Q, provided in the anode circuit of valve $L_2$, will therefore be able, as the current through it will fail, to close contacts actuating the signaling lamp V. Finally therefore, capacitor $r_3$ having been adjusted once for all, as well as main vernier capacitor $C_4$, vernier capacitor $r_2$ will be adjusted at such a value that relay Q will attract its armature, thus causing the opening of contacts, which will mean, for instance, that the grid of valve $L_2$ is slightly negative. Therefore, any variation causing the grid of valve $L_2$ to become more negative will cause the armature of relay Q to fall and the lamp signal to be lighted. There has been also provided acoustical signalling means consisting in a buzzer, the contact of which is shunted by a telephone receiver T. The buzzer is located inside the casing and the receiver is mounted, by means of a jack connector, on a head set carried by the operator.

Finally, the main switch I is also carried on the rod.

There has thus been possible to devise and realize a whole apparatus weighing less than 4 kilograms together with batteries and valves and consuming less than one watt supply power.

According to a modification, the valve $L_2$ may be substituted by a cathode ray indicator tube, the same being also directly placed on the carrying rod of the apparatus.

What I claim is:

1. In apparatus for the detection of metallic objects, the combination of, an oscillation generator, means to stabilize the frequency of said generator, a tuned circuit excited by said generator and including a search loop which is adapted to be positioned in the zone where metallic objects are to be detected, a bridge circuit having four legs which form in an electrical sense a square with two diagonals, circuit means impressing the voltage of said tuned circuit across one diagonal of said bridge and the voltage of said generator across the other diagonal of said bridge, said bridge being effective when said tuned circuit is in resonance to produce a balance of voltages, and means to produce a signal in response to an unbalance of voltages caused by the presence of a metallic object adjacent said loop.

2. In apparatus for the detection of metallic objects, the combination of, an oscillation generator, an oscillating circuit connected to be excited by said generator and including a search unit forming an inductance and a capacitance, said search unit being adapted to be positioned in the zone where metallic objects are to be detected, a secondary winding adapted to having induced therein a voltage dependent upon the voltage of said generator, said winding having a midtap, a pair of resistance units connected in series, a pair of condenser units connected in series and in turn connected respectively in parallel with said resistance units and thereby forming a voltage balance unit, a pair of rectifiers connected respectively to the opposite ends of said winding and in turn connected respectively to the opposite ends of said voltage balance unit, means connecting one side of said oscillating circuit to the midtap of said winding and the other side of said oscillating circuit to the juncture of said resistance units and the said condensers, the elements being so related that when said oscillating circuit is in resonance there is substantially zero voltage across said voltage balance unit, and signal means to produce a signal in response to the existence of a voltage across said voltage balance unit caused by the presence of a metallic object in the vicinity of said search unit.

3. Apparatus as described in claim 2 wherein said search unit includes an inductance unit formed by a single open-ended metallic loop.

HENRI CHIREIX.